United States Patent Office 3,268,625
Patented August 23, 1966

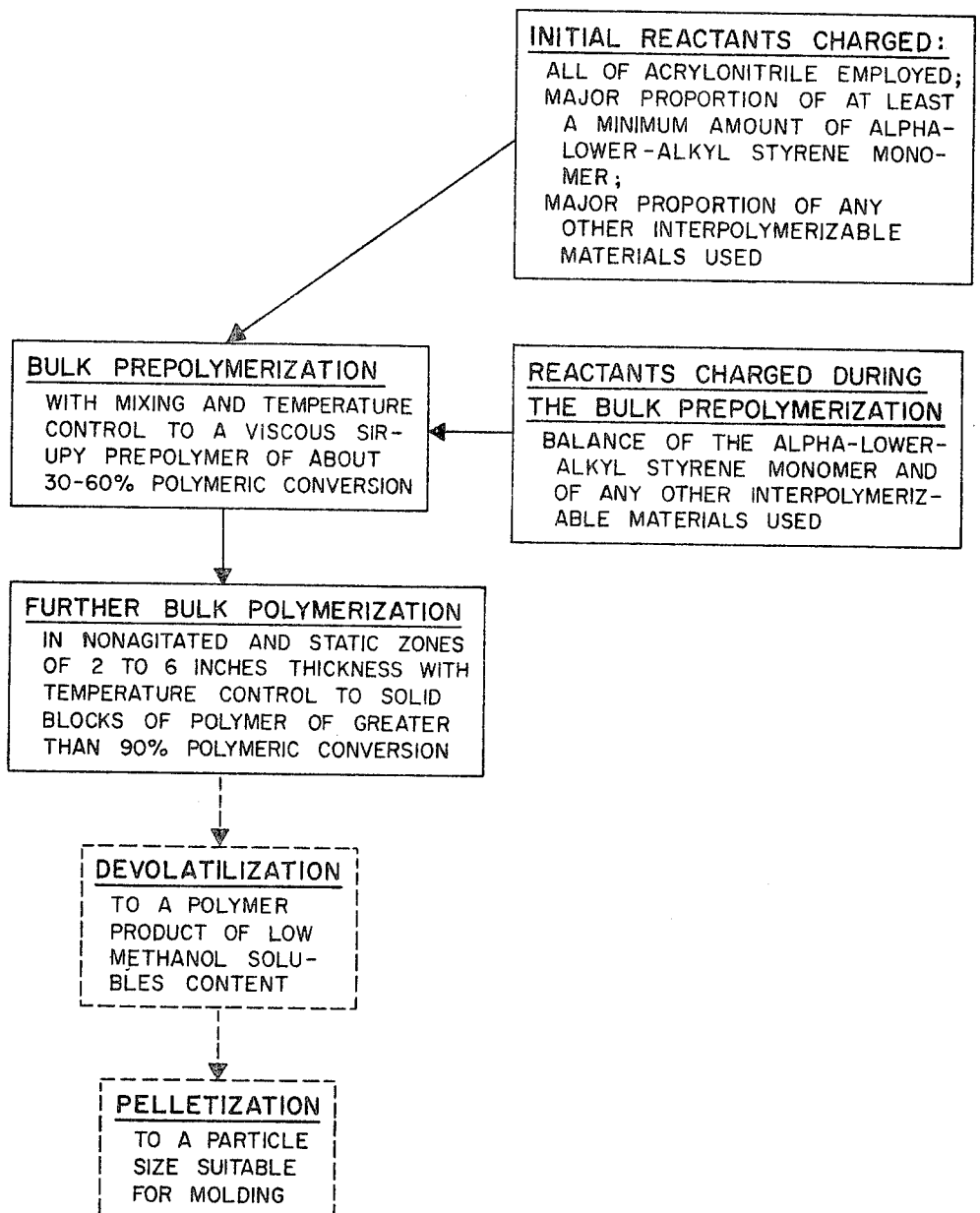

3,268,625
BULK INTERPOLYMERIZATION OF MONOMERIC MIXTURE COMPRISING ACRYLONITRILE AND ALPHA-ALKYL STYRENE
Faber B. Jones, Palmer B. Stickney, and Gilbert M. Gynn, Columbus, Ohio, assignors, by mesne assignments, to The Standard Oil Company, Cleveland, Ohio
Filed Dec. 26, 1962, Ser. No. 247,247
14 Claims. (Cl. 260—880)

This invention relates to a multistage bulk polymerization process for interpolymerization of acrylonitrile and alpha-lower alkyl styrene monomers with, and without, additional materials interpolymerizable therewith. More particularly, the invention concerns a process which includes the steps of: (a) a bulk prepolymerization with agitation to a viscous sirupy prepolymer with addition of interpolymerizable material during the prepolymerization; and (b) a further bulk polymerization without agitation of the prepolymer in static zones of from two to six inches in thickness to a conversion of more than 90 percent solid polymeric material; whereby there is provided an economically and commercially feasible rapid bulk polymerization process which results in useful polymer products.

The terms "bulk polymerization" and "mass polymerization" are used synonymously herein. In bulk or mass polymerization, polymerizable compounds, such as interpolymerizable monomers, are subject to polymerization in the absence of any added inert liquid reaction medium, such as water or an organic liquid, such as are used in solution, dispersion, and emulsion polymerization processes and the like. As in solution, dispersion, emulsion and the like polymerizations, polymerization initiators, catalysts, and the like, may, or may not be employed and be present during the bulk or mass polymerization. All "percents" and "parts" are used herein as "percents" and "parts" by weight, unless stated otherwise.

Polymer products containing chemically combined acrylonitrile in amounts of from about 15 percent to 48 percent of the polymer structure have been known for some years. These polymer products include: co-, ter-, tetra- etc., polymers containing chemically combined acrylonitrile and other interpolymerizable materials, such as styrene and alpha-methyl styrene; and blends of such polymers with other resinous polymeric materials. These polymer products are known to possess many desirable properties and to be capable of being molded under pressure at elevated temperatures, as by injection and/or compression molding. Such polymer products have attained commercial importance for the manufacture of numerous useful articles. Moldings of these polymer products possess such useful and desirable properties as transparency, clarity, good impact and tensile strength, good heat, abrasion and chemical resistance, and excellent electrical properties. Of particular commercial importance are polymer products of about 20 to 35 percent of chemically combined acrylonitrile in the polymer structure, as these polymers possess exceptionally desirable properties of transparency, lustre, good strength characteristics, resistance to solvents (e.g., gasoline and carbon tetrachloride) and ready ability to be molded under pressure at elevated temperatures into a variety of molded articles which are useful for many well-known purposes and applications.

Satisfactory utility and ease of molding depends greatly on the physical, mechanical, and chemical properties of the acrylonitrile interpolymer products, which, in turn, are influenced greatly by the particular interpolymerization technique and process, including reactant materials, amounts thereof, and process conditions, by which the products are prepared. There are aqueous emulsions, suspension, solution, dispersion, and bulk-polymerization techniques and methods for preparation of various acrylonitrile interpolymer products. Certain processes are practiced for particular purposes, and commercial advantages and disadvantages or inexpediencies are known for each.

A bulk-polymerization process and technique offers many attractive features and advantages. Advantageously, in bulk polymerization processes, no inert liquid medium is used, as is essential for the emulsion, suspension, solution, and dispersion processes. Consequently, in bulk polymerization, there exists an inherent economic advantage, in that there is no need for removal of liquid medium from the polymer product or for a separation of the polymer product from the liquid medium. However, difficulties do exist in bulk-polymerization processes for preparation of acrylonitrile polymer products. Some difficulties arise directly because of the nature and the various properties (e.g., the heat-sensitive nature, reactivities, thermal transfer, etc.) of the acrylonitrile monomer, other interpolymerizable materials, and resulting polymer products. Other difficulties arise because of the exothermic nature of the polymerization process.

Acrylonitrile monomers and various materials interpolymerizable therewith differ greatly in reactivity, that is, the rate at which various interpolymerizable reactants combine in the resulting polymer structure. Interpolymerizable reactants combine, in general, in relation to their respective proportions persent duing the polymerization. Thus, as a more reactive material in the reactant mixture is consumed and depleted more rapidly, the proportion of this material in the reactant mixture alters and the resulting polymer product structure is not chemically homogeneous. For example, in a batch bulk polymerization of a charge of styrene monomers and more than about 22 percent acrylonitrile monomer, the polymer product in the early stage of polymerization has a high content of chemically combined styrene and a low content of chemically combined acrylonitrile, while in the latter polymerization stages there results a polymer product of a low content of chemically combined styrene and a high content of chemically combined acrylonitrile.

Another difficulty in bulk polymerization processes is a suitable control and modulation of polymerization temperatures. In part, difficulty stems directly from the acrylonitrile monomer which in the polymerized state has relatively poor heat stability and is subject to discoloration and loss of clarity at excessively high temperatures. Also, in part, difficulties arise in that increases in polymerization temperatures tend to increase the polymerization rate with a resultant rapidly increased viscosity for the reactant mixture because of the increasing solids content therein. Also, polymerization at varying temperatures, and rates results in an excessive variation in polymer molecular weight. While some range in molecular weight of the polymer product is desirable and can be tolerated, a product ranging widely in molecular weight is not desirable. Low-molecular weight polymers and unreacted monomers are very detrimental to the polymer product properties and to its ready processing into useful articles. On the other hand, polymers of extremely high molecular weight are difficult to mold. At a particular bulk polymerization temperature, the amount of reactants decreases through polymerization thereof as polymerization proceeds, and the rate of polymerization becomes increasingly slower.

Therefore, to avoid excessively long and economically prohibitive polymerization times, bulk polymerization to a completion at a low temperature usually is not economically feasible.

As a batch bulk-polymerization proceeds and before interpolymerization of all reactants is completed, the reactant mixture sets to a sirupy semisolid-to-solid polymer mass which has relatively poor heat conductivity. Control and modulation of the exothermic reaction temperature is, as a result, difficult when bulk-polymerizing large volumes of reactants. Excessive heat build-up in the reactant mixture, not only constitutes a potential process safety hazard, but is detrimental to the properties of the resulting polymer product.

Agitation or mixing of the reactant mixture during polymerization is an aid for assuring and maintaining a uniform reactant temperature. Thorough mixing is desirable to avoid formation of objectionable amounts of low-molecular-weight polymers as a result of poor heat conductivity of the reactants and the reactant mixture during the course of the exothermic polymerization reaction. However, once the polymerization proceeds to where the reactant mixture becomes a sirupy, semisolid-to-solid polymer mass, mixing is highly impractical, if not impossible, to ensure temperature uniformity of the reactant mass and satisfactory heat transfer. Adding of more of the most reactive reactants during the bulk polymerization at a rate aimed at keeping the proportions of reacting material essentially constant and, therefore, to promote an essentially uniform polymer product throughout the course of the reaction, can be helpful. Here, also, once the polymerization advances to where the reactant mixture sets to a sirupy semisolid-to- solid mass, such addition is of dubious value. In addition, the amount to be added, and the rate of addition of the most reactive reactant during the polymerization to ensure a constant uniformly proportioned reactant mixture, are not easily determined and successfully accomplished. Were bulk polymerization to be carried forth not essentially to completion, low-molecular-weight polymer, unreacted reactants, and the like, would need to be removed from the partially polymerized mixture. Here, too, the cost of such removal is economically disadvantageous and temperature limitations exist during removal, if detriment to the polymer product is to be avoided.

As the polymerizing mass of reactants becomes more and more viscous as bulk polymerization proceeds, the viscosity and poor heat-transfer properties of the reactant mass make control and modulation of the exothermic temperature extremely difficult. It is in this stage of bulk polymerization of large amounts of reactants, that the greatest difficulties are encountered. At this stage there is encountered the greatest danger of run-away polymerization and loss of temperature control with accompanying excessively high temperatures detrimental to the polymer product. External cooling, by itself, generally is inadequate to control temperatures during this stage of the bulk polymerization because of the low surface to volume ratio of combined reactors.

The art by numerous processes has sought to overcome such just-described difficulties. It will be obvious that a number of difficulties are pecularly inherent to bulk-polymerization processes and are not of a serious concern in other polymerization processes, such as emulsion, suspension, solution, dispersion, and the like, which include a large amount of an inert, unreactive, liquid medium in which polymerization is carried forth.

External cooling has been practiced successfully on small-scale laboratory equipment, whereby heat transfer, by external cooling, of relatively small masses in small containers has resulted in satisfactory polymer products. Other means for overcoming various aforementioned bulk-polymerization process difficulties have been to use polymerization moderators to control and regulate the polymerization reaction. Generally, such moderators can be classes as two types—those which are nonreactive and thus require a subsequent removal from the polymer product, and those which react or enter into the polymerization and remain in the resulting polymer product. Nonreactive or inert moderators are well illustrated by inert liquid media used in emulsion, suspension, solution, dispersion, and like polymerization processes. However, a major advantage of bulk or mass polymerization is the absence of any substantial amount of non-reactive liquid moderators—even though some nonreactive liquid moderators have been taught for so-called bulk-polymerization processes.

More desirable and practical would be employment of a polymerization moderator which is reactive and enters into the polymerization reaction and which remains in the polymer product without any necessity for its removal upon completion of the polymerization to provide a satisfactory polymer product. Such a reactive moderator would eliminate many difficulties of the bulk-polymerization process, yet permit inherent economic process advantages of the bulk-polymerization process to be obtained. Desirably, such a polymerization rate moderator would be a material interpolymerizable with the acrylonitrile monomer and would possess a reactivity rate which would enable a modulation and control of the exothermic polymerization reaction to desirably influence the chemical homogeneity and molecular weight of the polymer product and to impart a desirably uniform narrow range of molecular weights and a desirably uniform homogeneous chemical structure for the polymer product.

It is an object of the invention to overcome numerous of the foregoing difficulties of bulk-polymerization processes by employing an alpha-lower alkyl styrene monomer as a reactive bulk-polymerization moderator.

One object of the invention is to provide a simple, economic, rapidly practiced, and reproducible, multistage, bulk-polymerization process of commercial utility for interpolymerizing acrylonitrile and alpha-lower alkyl styrene monomers with, and without, additional compounds interpolymerizable therewith.

Another object is a multistage bulk-polymerization process, yielding solid polymer products of predetermined chemically combined acrylonitrile content and of exceptionally uniform molecular weight and chemical composition.

Still another object is a multistage bulk-polymerization process providing relatively homogeneous and uniform polymer products containing about 15 to 48 percent of chemically combined acrylonitrile and at least that minimum amount of an alpha-lower alkyl styrene monomer which is effective as a reactive polymerization moderator.

A specific object is to produce relatively homogenous and uniform polymer products, containing between about 20 and 35 percent of chemically combined acrylonitrile therein, by a multistage bulk-polymerization process, wherein the acrylonitrile monomer is interpolymerized with an alpha-lower alkyl styrene in at least a minimum amount effective to moderate the bulk-polymerization reaction and to modify the molecular weight of the polymer product.

A further object is to provide a multistage bulk polymerization process comprising: a process step in which a bulk prepolymerization is carried forth with an initial reactant charge of all of the employed acrylonitrile monomer and a major proportion of other materials interpolymerizable therewith, including at least a major proportion of a certain minimum amount of alpha-lower alkyl styrene, and in which the balance of materials interpolymerizable materials used are added during the prepolymerization; and a process step in which a further bulk polymerization of the resulting prepolymer of the first process stage is carried forth in static zones of two to six inches in thickness to a conversion of more than 90 percent solid polymeric material.

All of the preceding, and other objects, will be readily apparent from the description and examples, which follow.

The accompanying drawing, which forms a part of the specification and which is to be read in conjunction therewith, is a block diagram showing the sequence of steps comprising the process with essential steps outlined by solid-line blocks and desirable, but optional, steps outlined by broken-line blocks.

In accordance with the invention there is carried forth: (a) bulk prepolymerization with agitation of the total amount of the employed acrylonitrile monomer with a major portion of the employed alpha-lower alkyl styrene monomer and plus a major portion of any other employed compounds copolymerizable therewith, and, during the bulk prepolymerization, addition of the balance of the alpha-lower alkyl styrene monomer and the balance of the other employed compounds; and (b) further bulk polymerization of the prepolymer from the bulk prepolymerization to a conversion of more than about 90 percent solid polymeric material, with the further polymerization being conducted in the absence of agitation in static zones of from two to six inches in thickness; whereby there is provided an economically feasible, reproducible, and rapid bulk polymerization process, which results in polymer products of exceptional properties and qualities. Desirably the process includes devolatilization of the solid polymer product of the further bulk polymerization to a polymer product of more than 98 percent polymeric material and comminution to a suitable particle size for molding applications.

More particularly, in the practice of the process, there always are employed an acrylonitrile monomer and an alpha-lower alkyl styrene monomer, with or without other materials. To produce copolymers there are employed acrylonitrile and alpha-lower alkyl styrene monomers; to produce ter-, tetra-, etc., polymers, there are employed acrylonitrile monomer, a lower-alkyl styrene monomer, and at least one other polymerizable material, interpolymerizable therewith; and, to produce polymer blends, there is included at least one polymer along with the reactants producing the polymer which contains chemically combined acrylonitrile and alpha-lower alkyl styrene and which is produced from reactant mixtures containing acrylonitrile monomer and alpha-lower alkyl styrene monomer.

The amount of acrylonitrile employed in the process may range from about 15 to 48 parts of each 100 parts of total polymerizable reactants. Depending on the employed amount of acrylonitrile monomer, there is a minimum amount of alpha-lower alkyl styrene monomer, which constitutes an effective bulk polymerization moderator, and at least this minimum amount must be employed. The minimum amount of alpha-lower alkyl styrene increases as the employed amount of acrylonitrile monomer in the reactant mixture is increased. For example, if the interpolymerizable reactant mixture contains about 15 parts of an acrylonitrile monomer, the minimum amount is about one part of an alpha-lower alkyl styrene monomer; and if the interpolymerizable reactant mixture contains about 48 parts of an acrylonitrile monomer, the minimum amount is about 52 parts of an alpha-lower alkyl styrene monomer. The smallest amount of alpha-lower alkyl styrene employed is at least one part of each 100 parts of the total polymerizable reactants. In producing an acrylonitrile/alpha-lower alkyl styrene copolymer by the multistage process, the largest amount of an alpha-lower alkyl styrene may range as high as about 50 to 80 parts of each 100 parts of the copolymerizable reactant mixture, but should not exceed about a one to one molar ratio with the acrylonitrile monomer in production of the copolymer. The exact amount of a particular alpha-lower alkyl styrene monomer depends greatly upon the particular acrylonitrile monomer and its amount and the desired reaction conditions. In preparation of preferred polymer products which contain from about 20 to 35 percent of chemically combined acrylonitrile in the polymer structure, the minimum amount of alpha-lower alkyl styrene monomer to be employed ranges from about 7 to 31 parts with from 20 to 35 parts of acrylonitrile monomer in 100 parts of total polymerizable reactants, about 7 parts being the minimum amount effective as a reactive polymerization moderator with 20 parts of acrylonitrile monomer in 100 parts of reactants, and about 31 parts being the minimum effective as a reactive polymerization moderator with 35 parts of acrylonitrile monomer in 100 parts of reactants. For preparation of polymer products from reactant mixtures which contain an amount of acrylonitrile monomer between 20 and 35 parts in 100 parts of reactants, the minimum amount of alpha-lower alkyl styrene effective as a reactive polymerization moderator is between about 7 and 31 parts and is in direct proportion to the amount of acrylonitrile monomer in excess of 20 parts. The minimum amount of an alpha-lower alkyl styrene cannot be more exactly defined, since it is somewhat dependent on the reactivity of the other monomers used, and the reactivity of the particular alpha-lower alkyl styrene monomer employed as the bulk polymerization moderator for a specific acrylonitrile monomer.

Table I, which follows, sets forth approximate amounts of the various interpolymerizable reactants which may be used for successful practice of the multistage process. In Table I, amounts of acrylonitrile monomer are tabulated in stepwise increments from about 15 parts to about 48 parts of each 100 parts of the reactant mixture along with the minimum amounts of alpha-lower alkyl styrene monomer which constitute an effective polymerization moderator for these amounts of acrylonitrile monomer. For amounts of acrylonitrile monomer intermediate to the amounts of acrylonitrile monomer tabulated in Table I, the minimum amount of alpha-lower alkyl styrene which must be used and the amounts of the other interpolymerizable materials, which may be employed for such an intermediate amount of acrylonitrile monomer, are intermediate and directly proportional to the respectively tabulated amounts of these reactants in Table I.

TABLE I
AMOUNTS OF REACTANTS EMPLOYED IN MULTISTAGE PROCESS

| Reactants [a] | Parts of Each Employed [b] | | | | | |
|---|---|---|---|---|---|---|
| Acrylonitrile Monomer (Total Amount) | ~15 | 22 | 28 | 33 | 40 | ~48 |
| Alpha-lower alkyl styrene Monomer (Min. Amount) [c] | ~1 | 8–12(10) | 16–24(20) | 23–33(28) | 32–48(40) | ~52 |
| Other [d] | ~84 | balance | balance | balance | balance | ~0 |
| Total Amount of Reactants | 100 | 100 | 100 | 100 | 100 | 100 |

[a] All of the acrylonitrile monomer is included in the initial reactant charge for prepolymerization along with at least 50%, preferably 60% to 80%, of the minimum amount of alpha-lower alkyl styrene monomer and of any other employed interpolymerizable reactant(s). The balance of the minimum amount of alpha-lower alkyl styrene monomer and of any other employed interpolymerizable reactants are added during the prepolymerization, preferably by intermittent additional charging or by slow continuous charging.

[b] Parts by weight per 100 parts of total polymerizable reactants; ~=about; average minimum amount in brackets.

[c] Minimum amount of alpha-lower alkyl styrene monomer to be employed with the indicated amount of acrylonitrile monomer.

[d] Other includes: (1) interpolymerizable reactants, such as additional alpha-lower alkyl styrene monomer, and other ethylenically unsaturated polymerizable materials such as styrene monomer, ethyl acrylate monomer, and the like; and (2) partially and completely polymerized polymers, such as butadieneacrylonitrile copolymers, styrene-butadiene copolymers, and the like, in amounts up to about 35 parts.

Subject to a requirement that the acrylonitrile and alpha-lower alkyl styrene reactants should not exceed about a one to one molar ratio in producing the copolymer by the multistage bulk polymerization process, another helpful manner of expressing the relationship between the employed amounts of the acrylonitrile and alpha-lower alkyl styrene reactants and of approximating the minimum amount of alpha-lower alkyl styrene monomer which is an effective bulk polymerization moderator and of which at least the minimum amount should be employed in producing co-, ter-, tetra-, etc., polymer products, is as follows: For each 100 parts of total polymerizable reactants for prepolymerization there are included: about $(15+n)$ parts of an acrylonitrile monomer, with $n$ representing a positive number up to about 33; at least a minimum amount of an alpha-lower alkyl styrene monomer effective as a bulk polymerization moderator, which minimum amount approximates from about $(1+1.3n)$ parts to about $(1+1.6n)$ parts of the alpha-lower alkyl styrene monomer; and, to make the 100 parts, a balance of one or more interpolymerizable materials selected from the group consisting of additional alpha-lower alkyl styrene monomer, other ethylenically unsaturated polymerizable materials, and up to about 35 parts of partially or completely polymerized polymers. With substantial amounts of one or more of the other interpolymerizable materials in the reactant mixture for prepolymerization and, depending on the reactivities of such other interpolymerizable materials, the minimum amount of the alpha-lower alkyl styrene monomer may vary slightly from the aforedefined approximated minimum amounts. Where such other employed interpolymerizable materials are less reactive than the employed alpha-lower alkyl styrene monomer, the minimum amount may be decreased accordingly. Conversely, where such other employed interpolymerizable materials are more reactive than the employed alpha-lower alkyl styrene monomer, the minimum amount should be increased accordingly.

The polymer product from the multistage process, depending on the particular reactants and the amounts used, may be: (a) acrylonitrile/alpha-lower alkyl styrene copolymers, in which a chemically combined acrylonitrile accounts for from about 20 to about 48 percent by weight of the copolymer structure, with the remainder of the copolymer structure being a chemically combined alpha-lower alkyl styrene; (b) ter-, tetra-, etc., polymers in which the chemically combined acrylonitrile content may range from about 15 to 48 percent of the polymer structure and in which the balance of the polymer structure is chemically combined alpha-lower alkyl styrene and other chemically combined interpolymerizable materials (this balance always includes at least that minimum amount of alpha-lower alkyl styrene effective as a reactive polymerization moderator), which minimum amount depends on the exact amount of acrylonitrile monomer employed and, thus, always amounts to at least from about 1 to 52 percent of chemically combined alpha-lower alkyl styrene in the polymer structure and (c) blends of up to about 35 parts of partially or completely polymerized compatible polymers, such as acrylonitrile/butadiene copolymers and the like, with each of the aforesaid co-, ter-, tetra-, etc., polymers and mixtures thereof which have chemically combined acrylonitrile contents of from 15 to 48 percent in the polymer structure.

In practice of the process, employment of at least the minimum amount of alpha-lower alkyl styrene is critical and essential. Unless at least the minimum amount is employed, the exothermic temperatures of the bulk polymerization will be uncontrollable and an unsatisfactory polymer product will result. With smaller amounts than the minimum amount of alpha-lower alkyl styrene, excessive polymerization temperatures and often a run-away and uncontrolled polymerization results; with the minimum amount and larger amounts than the minimum amount, the bulk polymerization temperatures and pressures are readily controlled and regulated, with the resulting polymer products being of excellent quality.

The initial charge of reactants for prepolymerization includes all of the acrylonitrile monomer and a major proportion (at least about one-half, parts by weight) of the alpha-lower alkyl styrene monomer and a major proportion (at least about one-half, parts by weight) of any other interpolymerizable material used. The balance of the interpolymerizing reactants then are added during the prepolymerization. Although the initially charged reactants include at least a major proportion of all reactants other than the acrylonitrile monomer, preferably from about 60 to 80 percent, and, most desirably, about three-fourths of all of the reactants, other than the acrylonitrile monomer, are included in the initial charge for prepolymerization. By including such amounts of reactants other than the acrylonitrile monomer with the entire amount of the acrylonitrile monomer in the initially charged reactant mixture, satisfactory prepolymerization temperatures and pressures are obtained and closely regulated and maintained during the prepolymerization in any of numerous conventional prepolymerization apparatus. Also greater homogeneity of the polymer produce results. As a general rule, such a bulk prepolymerization can be successfully carried out at pressures well below about 30 p.s.i. and at desirable temperatures well below about 100° C. A preferred prepolymerization temperature is between about 60 to 100° C,. and most desirably about 80° C., and for acrylonitrile/alpha-lower alkyl styrene/styrene terpolymers, preferably between 60 and 100° C., with an optimum temperature being about 80° C. Of course, if desired, prepolymerization may be carried forth at any conventional prepolymerization temperatures and pressures known to be useful in the art, and by variance of these conditions to regulate and control the prepolymerization, so that the interpolymerizable reactants polymerize and combine in a desired ratio in the prepolymer.

Important for successful operation of the multistage process is addition, during the prepolymerization, of the balance of the interpolymerizable reactants, which are not included in the initial charge. Such addition of the balance of the interpolymerizable reactants may be by a slow continuous addition or, by adding small increments of the balance over suitably spaced intervals throughout the prepolymerization (conveniently with equal increments thereof at equally spaced intervals). Adding of the balance of the interpolymerizable reactants during the prepolymerization insures uniformity and close control of the prepolymer's molecular weight and of the ratio in which the interpolymerizable reactants are polymerized. Adding of all of the balance of the interpolymerizable reactants during the prepolymerization should be completed before prepolymerization is discontinued and the resulting prepolymer further polymerized. Desirably the adding of all of the interpolymerizable reactants is completed during the interval in which the prepolymerization is from 40 to 95 percent completed, and preferably is completed during the interval in which the prepolymerization is from 65 to 85 percent completed. This corresponds to about 15 to 55 percent total polymer conversion. More rapid addition of the balance of the interpolymerizing reactant leads to heterogeneity in molecular weight and structure of the prepolymer. A failure to complete the addition of the balance before discontinuing the prepolymerization generally results in inability to suitably control the further bulk prepolymerization. It appears to be necessary that all of the interpolymerizable reactants shall have undergone some bulk prepolymerization before any further bulk prepolymerization is attempted or else the process is inoperative from a practical viewpoint because of lack of control of the further bulk polymerization, with a resulting product of relatively inferior properties.

During prepolymerization, the reactant mixture and prepolymer formed therein are rapidly stirred and agitated. Uniformity of the prepolymerization mixture assists in temperature control of the prepolymerization and in the obtaining of uniform and homogeneous prepolymers. Any of numerous means known to the art, such as stirrers, mixers, or the like for imparting agitation or stirring to the reactant mixture, may be used, and the only criteria for the particular means is that the same be able to maintain a uniformly and thoroughly mixed reactant mixture during the prepolymerization.

Determination of the progress of the prepolymerization may be by any known means. Torque or forces required for stirring or agitating the reacting mixture may be measured, and the same used as an indication of the viscosity of the prepolymer and, thus, the extent of prepolymerization. Other techniques, such as withdrawing of a small sample of the reacting mixture at various intervals during the prepolymerization and measurement of the solids content of the withdrawn sample, and the like techniques, also may be used to determine and follow the extent of the prepolymerization conversion. In practice of the multistage process, prepolymerization is carried forth for a time sufficient to provide a viscous and sirupy prepolymer which is still capable of transfer by fluid transfer means, such as pumps, pipes, conduits, hydraulic and other means appropriate to the transfer of liquids. Generally, this means that prepolymerization is carried to a stage in which polymer conversion is in excess of about 30 percent, generally and preferably between about 40 to 60 percent, and rarely a conversion in excess of about 65 percent. The prepolymerization should not be to a conversion in which the prepolymer is a solid mass or a mass of such a solidlike character that is incapable of transfer by fluid-transfer means at the highest temperature employed during the prepolymerization.

Upon attaining the desired extent of conversion during prepolymerization, i.e., to a viscous and sirupy prepolymer, prepolymerization is discontinued with the resulting prepolymer then being transferred by a fluid-transfer means to a suitable apparatus for further bulk polymerization. Desirably, the transfer is made with the prepolymer being maintained at, or very close to, its temperature during the latter stage of the prepolymerization. Means conventional for transfer of viscous liquid and the like materials are employed for transfer of the prepolymer, with the temperature of the prepolymer desirably being maintained by conventional means for cooling and/or heating of the transfer conduit, depending greatly on the particular transfer means employed. Desirably, the transfer conduit and the further bulk polymerization apparatus, prior to transfer, are preheated to about the temperature of the prepolymer being transferred, to avoid undue temperature changes in the prepolymer. If the prepolymerization apparatus be of a suitable construction, transfer of the prepolymer can be eliminated with the further bulk polymerization being carried forth in the prepolymerization apparatus. Where no transfer of the prepolymer is made, it is desirable to remove the agitating or stirring means from the prepolymer before further bulk polymerization to a solid polymer product. More desirably, the bulk further polymerization is carried forth in a plate-and-frame reactor, such as is conventionally known to the art for bulk polymerization of styrene monomer to polystyrene. Useful and suitable conventional plate-and-frame reactors, and other apparatuses which may be readily devised by one skilled in the art, generally comprise a plurality of frames or vessels, or the like, for containment of the bulk viscous and sirupy prepolymer mass in a nonagitated zone, or zones, until a solid block of polymer is obtained, and a means for transferring heat from the wall surfaces of the frame or vessel, or the like, which contains the prepolymer mass being further polymerized. Suitable apparatuses can range in size from laboratory models, in which blocks of polymers from 2 to 6 inches in thickness by 1 foot square, or more, may be produced, to large commercial apparatuses in which polymers are produced in blocks from about 2 to 6 inches, or more, in thickness by 2 or 3 feet, or more, in diameter, or length and height. Generally, the commercial apparatuses comprise a series of alternately spaced closed frames of a desired size, separated by cored plates through which heat-transfer liquids may be circulated. In many apparatuses, the surfaces of the frames and plates contacting the mass being further polymerized are constructed with a surface which is nonadherent to the particular polymer being produced, and/or are surface coated with a release agent. In some apparatuses, the plates are tapered slightly so that the resulting polymer block is tapered and easily removed from the polymerization apparatus.

In general, heat transfer from bulk polymerizing reactants in a static mass is limited by the heat-transfer characteristics of the particular static mass being polymerized, once adequate provision has been made for removal of the heat from the surfaces of the static mass. Thus, if a static mass of excessive thickness is employed, although the surfaces and outer regions of the mass can be controlled to a desired temperature, higher temperatures develop in the central and interior regions of the mass due to the poor rate of heat transfer to the surfaces from the interior of the mass. This nonuniformity of temperature and regions of excessive temperature often results in bubbles or the like in the polymer product. More frequently, it is apparent by a resulting polymer product being heterogenous polymer, i.e., with varied ratios of combined monomers and a different average molecular weight than would be obtained if the further bulk polymerized mass was maintained throughout at a uniform temperature. In further bulk polymerization by the multistage process, the prepolymer inherently has reaction rates enabling the employment of static zones of from two to six inches in thickness by almost any size diameter or length and height for the polymer block produced. Any differential in temperature of various regions of the static mass undergoing bulk further polymerization in the bulk-stage polymerization process is less than about 40° C. Such temperature uniformity is believed to be possible because of employment of at least the minimum amount of the alpha-lower alkyl styrene monomer reactant to build within the prepolymer suitable and satisfactory reaction rate characteristics.

Further bulk polymerization is carried forth at a temperature generally higher than the highest temperature employed in preparation of the prepolymer. Prepolymerization temperatures rarely exceed about 100° C. Suitable temperatures for further bulk polymerization usually are above 60° C., generally between 100 and 200° C., more frequently above about 140° C. and desirably not in excess of about 180° C. Shortly after bulk prepolymerization, that is, shortly after conversion to a viscous and sirupy prepolymer, there occurs spontaneous exothermic polymerization temperature rise known as the "peak exothermic temperature." Failure to regulate and control this peak exothermic temperature is detrimental to the properties of the produced polymer. In the bulk multistage process, the peak exothermic temperature which results during the further bulk polymerization has been decreased and moderated by employment of at least the minimum amount of the alpha-lower alkyl styrene monomer reactant. The peak exothermic temperature encountered in the further bulk polymerization is lower than would be found if less than the minimum amount of the alpha-lower alkyl styrene were to be employed in the prepolymer and lower than would be found if the prepolymerization were to be carried forth in a static state or were to be carried forth with no adding of interpolymerizable reactants during the prepolymerization. The peak exothermic temperature encountered in the multistage polymerization process is such that the temperature differential of interior and outer regions of the polymer during further bulk polymerization can be held to less than about 40° C. for static bulk masses of from two to six inches in thickness. As a direct result of being able to so closely maintain and modulate the peak exothermic temperature throughout the produced polymer block, there results polymer products possessed of exceptionally satisfactory properties. After the peak exothermic temperature has been reached during the further bulk polymerization, generally it is necessary to supply heat to the mass through its surfaces to maintain a suitable polymerization temperature and rate and to shorten the polymerization time. This is readily accomplished, as by circulation of a hot heat-exchange medium through the cored plates. Further bulk polymerization, after passage of the peak exothermic temperature, is carried forth generally at a temperature somewhat below, usually about 5° to 20° C. below, the peak exothermic temperature until completion of the polymerization. Somewhat lower temperatures may be employed, if desired, for completion of the further bulk polymerization, but generally are accompanied by somewhat longer polymerization times being required.

Polymerization should be carried on for a time sufficient to yield a polymer in which in excess of 90 percent, preferably in excess of 95 percent, of the interpolymerizable reactants have been reacted. Conversions of greater than 90 percent have been obtained in as low as from 10 to 15 hours and less, although, when employing some interpolymerizable reactants, the further bulk polymerization may require somewhat longer times. Usually, the extent of conversion during the further bulk polymerization is determined by measurement of the methanol-soluble content of the polymer product.

Upon attainment of a conversion in excess of 90 percent in the further bulk polymerization apparatus, the resulting polymer product block is removed from the apparatus and, as removed, is useful for some applications. Generally, however, for molding and the like applications, it is desirable to use a polymer of a content of less than about 2 percent of methanol solubles. Thus, for such applications, the polymer product block from the bulk further polymerization apparatus is devolatilized. Devolatilization may be by any conventional technique and means known to the art. Usually the polymer product block is comminuted as by crushing, grinding, pulverizing, or the like, and then devolatilized to obtain a polymer product of the desired low methanol-soluble content. Conventional apparatuses for crushing, grinding, and the like, are employed, and numerous of such useful apparatuses are known to the art. The comminuted solid product may be vacuum-devolatilized under heat; or, more desirably, devolatilization is by means of a plastic extruder equipped with a vacuum-devolatilization means, and, as extruded, the extruded product comminuted or pelletized to a size suitable for molding. Molding of the produced polymer product can be by techniques and conditions and apparatuses known to the art for the molding of like polymer products.

The multistage process will be more fully understood by references now to the examples, which follow, wherein a number of specific embodiments are illustrated.

*Example I*

This preferred example is of the preparation of a terpolymer employing acrylonitrile, styrene, and alpha-methyl styrene monomeric reactants in a ratio of 28/52/20, respectively.

*Prepolymerization.*—About 2240 parts of acrylonitrile monomer, 3410 parts of styrene monomer, 1200 parts of alpha-methyl styrene monomer, and 4 parts of alpha, alpha'-azobisisobutyronitrile are charged to a stainless steel prepolymerization reactor kettle.

The reactor kettle is equipped with a means for stirring of the contents and with an internal spirally coiled tube through which water or steam, as desired, may be passed for heating of the contents of the kettle.

The reactor kettle also is equipped with: a means for measurement of the temperature of the contents of the kettle; a nitrogen inlet; an inlet for addition of materials; a self-sealing port for addition of the initiator or catalyst; a pressure gage and relief valve; a sampling valve; and a discharge valve and pipe for draining the contents of the kettle and transferring them.

After the kettle is charged, it is purged with nitrogen gas and sealed with the charged reactant mixture under 2 to 3 p.s.i.g. of nitrogen. The charged reactant mixture is stirred, and steam is circulated through the spirally coiled tube to initiate the polymerization reaction by bringing the charge to about 80° C. The reaction tends to be autocatalytic, and steam or cooling water, as needed, is circulated through the spirally coiled tube ot maintain the charged mixture at 80±2° C. during the prepolymerization. Pressure build-up in the reactor kettle to between 10 to 12 p.s.i.g. is noted.

About 30 minutes after the reaction has been initiated, there is added to the kettle 250 parts of a monomer mixture. The added monomer mixture consists essentially of about 65 percent by weight of styrene monomer and about 35 percent by weight of alpha-methyl styrene monomer. Fifteen minutes later, about 50 parts of a like monomer mixture and 4 parts of alpha,alpha'-azobisisobutyronitrile are added to the kettle. At one hour, also at 1¾ hours, and also at 2½ hours, after the reaction has been initiated, 250 parts of a like monomer mixture are added. By about three hours after initiation of the polymerization reaction there will have been noted a significant increase in viscosity and, at this time, the polymerization conversion approximates about 35 to 40 percent. Conversion progress during the prepolymerization is followed by withdrawing small samples of the contents of the kettle at appropriate intervals and determining the solids content of the withdrawn samples.

*Further polymerization.*—At this time, the kettle's discharge valve is opened and a nitrogen pressure of between 20 and 30 p.s.i.g. employed to force-drain the kettle of its contents, now a viscous sirupy prepolymer, and to transfer these contents through a pipe at a temperature of about 80° C. to a number of frames of a plate-and-frame reactor for further polymerization.

The plate-and-frame reactor consists essentially of alternately cored plates and frames, each frame being about 5 inches in width so that cored plates are spaced 5 inches apart in the reactor. Each frame is fitted with a pressure gage, a relief valve, and an inlet for charging nitrogen along with a temperature-sensing means for measuring the temperature of material in the frame. The cored plates are so constructed that steam or cooling water, as desired, can be passed through the cored plates in response to the temperature-sensing means to closely maintain the plates at a desired temperature.

Prior to transfer of the viscous sirupy prepolymer to the plate-and-frame reactor, the plates which will contact the transferred prepolymer desirably are given a light coating of a release agent, such as dispersion of a small amount of magnesium or stannous stearate in benzene; the reactor is thoroughly purged with nitrogen gas; and the plates are heated to a temperature of from 80° to 90° C. Immediately following transfer of the prepolymer to the plate-and-frame reactor, cooling water is flowed through the cored plates, as needed, to hold the peak exothermic temperature of the reaction mixture to below about 170° C. After about 3 to 5 hours in the plate-and-frame reactor, the prepolymer has passed through an exothermic region, sufficient to maintain polymerization, and a pressure build-up to about 30 p.s.i.g. in the plate-and-frame reactor will have been noted. At this time, as needed, steam is circulated through the cored plates to heat and to maintain the reaction mixture at from 155 to 160° C. for about 10 hours. The elapsed total of the prepolymerization and the further polymerization times now approximates about 20 hours. The cored plates then are cooled by circulating water therethrough to cool the polymer product. After cooling, the product is removed, as a number of solid blocks, each about five inches thick. Each block consists essentially of more than 90 percent fully polymerized terpolymer, with a small amount of volatile materials being present, primarily unpolymerized monomers.

*Devolatilization.*—The solid block terpolymer product is broken or ground into appropriately sized pieces or chunks by any conventional means. The ground terpolymer then is fed into a devolatilizer-extruder and extruded into small rods. The extruded rods, while still warm, are passed through a pelletizer and chopped into small particles of a size suitable for injection molding. The passing of the polymer product through the extruder and the chopping of the same into small particles removes a substantial amount of the volatile materials therefrom, and the particulate polymer product consists essentially of greater than about 98 percent terpolymer and of less than 2 percent of methanol-soluble material. The terpolymer analyzes 28 percent acrylonitrile, approximately 52 percen styrene, and approximately 20 percent alpha-methyl styrene, and has an average molecular weight of 58,000 (estimated from dilute solution viscosity in dimethyl formamide using equation of Krigbaum and Kotliar; $[\eta]=1.55\times10^{-4}(M_w)^{0.8}$).

The polymer product can be molded in a conventional injection molding machine at 450° F. stock temperature. The terpolymer moldings, after annealing at 60°–70° C. for 24 hours, have a flexural modulus of $5.2\times10^5$ p.s.i. and a flexural strength of 18,500 p.s.i. (ASTM B–790–59P), an Izod impact strength of 0.22 foot pound per inch notch (ASTM D–256–56, Method A), and a heat deflection temperature of 96° C. (ASTM D–648–56).

*Example II*

By a procedure like that of Example I, there is prepared an acrylonitrile/alpha-methyl styrene copolymer employing the acrylonitrile and the alpha-methyl styrene monomeric reactants in a ratio of about 30 to 70, respectively.

About 2400 parts of the acrylonitrile monomer, 5550 parts of alpha-methyl styrene monomer, and 4 parts of alpha,alpha'-azobisisobutyronitrile are blended with agitation in the prepolymerization reactor kettle and brought to a temperature of about 80° C. to initiate the polymerization reaction. During prepolymerization, the reactant mixture is stirred vigorously and maintained at 80 to 100° C. by cooling the reactor kettle as needed. About one hour after commencement of the polymerization, there are added 50 parts of alpha-methyl styrene and 4 parts of alpha,alpha'-azobisisobutyronitrile; and, about three hours after polymerization commencement, there are added 50 parts of alpha-methyl styrene and 4 parts of alpha,alpha'-azobisisobutyronitrile. The prepolymerization is carried forth for about eight hours, at which time the prepolymerization product is a viscous sirupy mass. This prepolymer, while maintained at a temperature of about 95° C., is transferred to a plate-and-frame reactor, in which cored plates, preheated to about 100° C., are spaced about five inches apart. The prepolymer then, without any agitation or stirring, is permitted to polymerize further. After several hours, the reactant mass reaches a peak exothermic temperature of about 175° C., which peak temperature is controlled by cooling of the cored plates by passage of a liquid coolant therethrough. Several hours later, as the temperature of the reactant mass tends to drop, the liquid coolant passing through the cored plates is replaced by steam, to maintain the reactant mass at a temperature of 130 to 140° C. for the remainder of the further polymerization. The further polymerization is carried forth for about 18 hours, with the over-all time for the prepolymerization and further polymerization totaling about 26 hours. At this time, the almost completely polymerized product is cooled and removed from the plate-and-frame reactor. The product is a number of solid blocks of copolymer, each block about five inches thick, and consisting essentially of more than 95 percent of acrylonitrile/alpha-methyl styrene copolymer.

These blocks are broken into fragments, extruded and devolatilized, and the extruded product chopped into particles of a size suitable for injection molding. The extruded polymer product consists of more than 99 percent copolymer. The copolymer has an acrylonitrile content of 31 percent, as estimated by its nitrogen content determined by the Kjeldahl analysis, and an average molecular weight of about 37,000, as estimated from the intrinsic viscosity of the copolymer product.

After molding of the copolymer product in a conventional injection molding machine at a 450° F. stock temperature, and after annealing the moldings at 60–70° C. for 24 hours, the copolymer moldings are found to have a flexural modulus of $4.9\times10^5$ p.s.i., a flexural strength of 16,500 p.s.i. (ASTM D–790–59 T), and Izod impact strength of 0.32 foot pound per inch notch (ASTM D–256–56, Method A), and a heat-deflection temperature of 86° C. (ASTM D–648–56).

*Examples III to IX*

Additional terpolymers are prepared by a procedure substantially like that of Example I, employing acrylonitrile, alpha-methyl styrene, and styrene monomeric reactants. Table II, which follows, details of a number of these illustrative preparations. Table III, which follows, gives property data for the resulting terpolymer products of a number of these examples.

TABLE II

| Example No. | Initial Charge [a] | Incremental Addition Schedule | | | | | | | | |
|---|---|---|---|---|---|---|---|---|---|---|
| | | 1st | | 2nd | | 3rd | | 4th | | 5th | |
| | | Elapsed Time, hrs. | Addition | Elapsed Time, hrs. | Addition | Elapsed Time, hrs. | Addition | Elapsed Time, hrs. | Addition | Elapsed Time, hrs. | Addition |
| III | 2,240 AN<br>4,160 S<br>1,450 MS<br>2 AIBN | ½ | 50 MS<br>2 AIBN | 1 | 50 MS<br>2 AIBN | 2 | 50 MS<br>2 AIBN | | 50 MS<br>2 AIBN | | |
| IV | 2,240 AN<br>3,410 S<br>1,200 MS<br>4 AIBN | ½ | 163 S<br>87 MS | ¾ | 32.6 S<br>17.4 MS<br>4 AIBN | 1 | 163 S<br>87 MS | 1¾ | 163 S<br>87 MS | 2½ | 230 S<br>120 MS. |
| V | 2,240 AN<br>3,410 S<br>1,200 MS<br>4 AIBN | ½ | 163 S<br>87 MS | ¾ | 32.6 S<br>17.4 MS<br>4 AIBN | 1 | 163 S<br>87 MS | 1¾ | 163 S<br>87 MS | 2½ | 230 S<br>120 MS. |
| VI | 2,240 AN<br>3,410 S<br>1,200 MS<br>4 AIBN | ½ | 163 S<br>87 MS | ¾ | 32.6 S<br>17.4 MS<br>4 AIBN | 1 | 163 S<br>87 MS | 1¾ | 163 S<br>87 MS | 2½ | 228.2 S<br>121.8 MS<br>4 DTBP. |
| VII | 2,240 AN<br>3,160 S<br>1,200 MS<br>4 AIBN | ½ | 333 S<br>33 MS<br>4 AIBN | 1 | 333 S<br>33 MS<br>4 AIBN | 2 | 333 S<br>33 MS<br>4 AIBN | | | | |
| VIII | 1,680 AN<br>3,010 S<br>1,220 MS<br>8 AIBN | 1 | 700 S<br>150 MS<br>4 AIBN | 3 | 700 S<br>150 MS<br>4 AIBN | | | | | | |
| IX | 2,590 AN<br>1,910 S<br>1,920 MS<br>8 AIBN | ½ | 450 S<br>180 S<br>4 AIBN | 1½ | 450 S<br>180 S<br>4 AIBN | | | | | | |

| Example No. | Prepolymerization | | | | | Further Polymerization | | | | Product | |
|---|---|---|---|---|---|---|---|---|---|---|---|
| | Elapsed Time, hrs. | Temp., °F. | Solids,[b] percent | $M_w$ [c] | AN,[d] percent | Temp.,[e] °C. | Pressure, p.s.i. | Total Time, hrs. | $M_w$ [c] | AN,[d] percent | MeOH Sol,[f] percent |
| III | 1½<br>3½ | 70–80 | 21<br>44 | 49,000<br>49,000 | 25<br>25 | 45–160<br>(170) | 30 | 17 | 49,000 | 26 | 6.5 |
| IV | 2¾ | 75–80 | 42 | | | 80–140<br>(175) | 30 | 18¼ | 58,000 | 28 | |
| V | 2¾ | 75–80 | 42 | | | 80–140 | 41 | 18¼ | 58,000 | 28 | |
| VI | ½<br>¾<br>1<br>1¾<br>2½<br>2¾ | 70–80 | 7<br>26<br>30<br>35<br>43<br>43 | 49,000<br>35,000<br>44,000<br>44,000<br>44,000<br>44,000 | 28<br>28<br>29<br>29<br>29<br>29 | 75–170<br>(170) | 10 | 14½ | 44,000 | 29 | 6 |
| VII | ½<br>1<br>1½<br>2<br>2½<br>3<br>3¼ | 70–80 | 3<br>7<br>13<br>23<br>29<br>35<br>43 | 35,000<br>29,000<br>29,000<br>29,000<br>29,000 | 30<br>29<br>28<br>28<br>26<br>27<br>26 | 80–180<br>(180) | | 17½ | 44,000 | 31 | |
| VIII | 5¾ | 60–70 | 45 | | | 65–160<br>(125) | 20 | 14½ | 39,000 | 24 | 2.0 |
| IX | 2½ | 80–90 | 45 | | | 40–160<br>(150) | 35 | 21½ | 33,000 | 34 | 8.8 |

[a] Parts by weight; charged to a stainless steel polymerization kettle, purged with nitrogen and heated with stirring to reaction temperature; AN=acrylonitrile monomer; S=styrene monomer; MS=alpha-methyl styrene monomer; AIBN=a,a'-azobisisobutyronitrile; DTBP=di-tertiary butyl peroxide.
[b] Solids determined by heating the sample mixed with ~5 ml of a 0.2 percent t-butyl catechol-acetone solution to dryness.
[c] Estimated from dilute solution viscosity in dimethyl formamide using equation of Krigbaum and Kotliar $[\eta]=1.55\times10^{-3}(M_f)^{0.8}$.
[d] Estimated from nitrogen content of polymer as determined by Kjeldahl analysis.
[e] Number in parenthesis is peak exotherm temperature.
[f] Methanol-soluble content determined by ASTM Method 703-44T.

TABLE III. PROPERTY DATA

| Property | ASTM Test Method | Composite of Ex. IV and V | | Ex. VIII | Ex. IX |
|---|---|---|---|---|---|
| | | Annealed [a] | Unannealed | Annealed [a] | Annealed [a] |
| Tensile Strength, p.s.i. | D638–58T | 11,600 | 10,500 | | |
| Modulus in Tension, $10^5$ p.s.i. | D638–58T | 4.6 | 4.7 | | |
| Elongation, percent | D638–58T | 2.8 | 3.2 | | |
| Flexural Strength, p.s.i. | D790–58T | 18,500 | 17,800 | 16,800 | 19,000 |
| Flexural Modulus, $10^5$ p.s.i. | D790–58T | 5.2 | 5.1 | 4.8 | 5.4 |
| Impact Strength, ft.-lb./in. notch. (Izod notched, ½ x ⅛-inch bar). | D256–56 | | | | |
| Gate end | | 0.22 | 0.21 | 0.16 | 0.20 |
| Dead end | | 0.2 | 0.21 | 0.16 | 0.20 |
| Heat-Deflection Temperature Under Load, ° C. (½ x ⅛-inch bar, 264-p.s.i. fiber stress). | D648–56 | 96 | 82 | 97 | 96 |
| Rockwell Hardness | D785–51 | | 85 | | |
| Dielectric Constant (23° C.). (2 x ⅛-inch disk) | D150–59T | | | | |
| $10^3$ cps | | | 2.86 | | |
| $10^6$ cps | | | 2.84 | | |
| Dissipation Factor (23° C.). (2 x ⅛-inch disk) | D150–59T | | | | |
| $10^3$ cps | | | 0.0090 | | |
| $10^6$ cps | | | 0.0083 | | |
| Water Absorption, 24 Hours, percent | D570–57T | | 0.29 | | |
| Linear Coefficient of Thermal Expansion, $10^{-5}$ in./in./ F. | D696–55 | 3.4 | | | |
| Flammability, in./min. (½ x ⅛-in bar) | D635–56T | | 0.94 | | |
| Specific Gravity | D792–50 | | 1.09 | | |
| Refractive Index | D542–50 | | 1.59 | | |
| Melt Flow | [b] | 14 | | 9.6 | 5 |

[a] Specimens were annealed 24 hours at 80° C. prior to testing.

[b] Grams/10 minutes. Determined in PPI melt plastometer at 230° C./300 psi. Orifice dimensions: length, 0.155 in.; dia., 0.042 in.

NOTE: Specimens were molded in an injection-molding machine and were conditioned prior to testing as required by ASTM test methods. Molding conditions: barrel and head, 380 F., die, 400 F., mold, 130 F., cycle time, 43 seconds, pressure, 800 to 1,000 p.s.i.g.; all data are the average of two or more tests.

In general, ethylenically unsaturated monomers, suitable for interpolymerization, contain at least one $>C=C<$ grouping, and preferably have a boiling point of at least about 60° C. at 760 mm. of mercury pressure. These ethylenically unsaturated monomers include those in which unsaturation is due to a single ethylenic group which is attached to a negative radical and, thus include numerous polymerizable vinyl and vinylidene compounds. Illustrative of the monovinyl-substituted aromatic hydrocarbons, which are suitable interpolymerizable materials, are: styrene; the various alkyl styrenes, e.g., o-, m-, p-methyl-, ethyl-, propyl-, butyl-, amyl-, etc., styrenes, o-, m-, p-cyclohexyl styrenes, the various isomeric dimethyl-, diethyl-, dipropyl-, etc., styrenes; and the various mono-vinyl-substituted naphthalenes and alkylnaphthalenes. Illustrative of some aliphatic compounds containing a $CH_2=CH<$ grouping are: acrylic acid and the various alpha-substituted acrylic acids, e.g., methacrylic acid, ethyacrylic acid, phenylacrylic acid, etc.; esters of the aforesaid acrylic acids, more particularly the alkyl esters of acrylic acid, e.g., the ethyl, propyl, isopropyl, n-butyl, iso-butyl, sec-butyl, ter-butyl, amyl, hexyl, heptyl, octyl, decyl, dodecyl, etc., esters of acrylic, methacrylic, ethacrylic, phenylacrylic, etc., acids, including the alkyl acrylates containing not more than 4 carbon atoms in the alkyl grouping. Useful vinyl-substituted aromatic or ring compounds, which differ from the mono-vinyl-substituted aromatic hydrocarbons, are: e.g., the various o-, m-, p-cyanostyrenes; the various vinyl-pyridines, including 2-vinylpyridine, 2-methyl-5-vinylpyridine, 2-vinyl-5-ethylpyridine, etc.; in addition, ethylenically unsaturated polycarboxylic acids derivatives, e.g., maleic anhydride; citraconic acid anhydride; and the esters thereof and of fumaric acid, e.g., monomethyl and methyl fumarates and maleates; dimethyl and ethyl-fumarates and maleates, etc., may be employed. Other useful copolymerizable monomers are: unsaturated ethers, e.g., ethyl vinyl ether; methyl vinyl ether; propyl vinyl ether; butyl vinyl ether; ethyl allyl ether; diallyl ether, etc.; unsaturated aldehydes, e.g., crotonaldehyde, cinnamaldehyde, etc. Still other examples of unsaturated materials which can be copolymerized with the acrylonitrile and the alpha-lower alkyl styrene monomers could be mentioned but, to one skilled in the art, reference to literature and to standard texts will make utility of the aforesaid-listed polymerizable compounds and of numerous other interpolymerizable materials readily apparent for employment in the multistage bulk polymerization process.

As illustrative of suitable and useful partially and completely polymerized polymers, there are: natural rubber; synthetic "natural" rubbers derived from butadiene and isoprene; acrylonitrile-butadiene copolymers; styrene-butadiene copolymers; and various other elastomeric polymers containing residual unsaturation; and the like. Numerous of such partially and completely polymerized polymers are known, as well of the materials from which they are produced. As illustrative of butadiene monomers useful for preparation of acrylonitrile-butadiene copolymers, styrene-butadiene copolymers, and like copolymers, there are mentioned conjugated butadienes and 1,3-butadiene monomers such as butadiene (1,3-butadiene), 2,3-dimethyl-1,3-butadiene, isoprene, piperylene, 3-furyl-1,3-butadiene, 3-methoxy-1,3-butadiene, and the like; haloprenes, such as chloroprene (2-chloro-1,3-butadiene), bromoprene, methylchloroprene (2-chloro-3-methyl-1,3-butadiene), and the like.

While the preceding specific embodiments have illustrated application of the process to produce an acrylonitrile/alpha-methyl styrene copolymer and to produce terpolymers from interpolymerization of acrylonitrile/ alpha-methyl styrene/styrene monomer reactants, the multistage bulk polymerization process is useful for the preparation of many other polymer products. In addition to being applicable to produce the already illustrated co- and ter-polymers employing acrylonitrile and alpha-methyl styrene, the process may be employed to produce additional co- and ter-polymers and other terpolymers, tetrapolymers, etc., employing, along with the acrylonitrile and alpha-methyl styrene monomers, at least one or more polymerizable compounds interpolymerizable therewith. For example, the process can be applied to produce terpolymers of acrylonitrile, alpha-methyl styrene, and an ethylenically unsaturated monomer interpolymerizable therewith; tetra- and higher-polymers of acrylonitrile, alpha-methyl styrene, and two or more ethylenically unsaturated monomers copolymerizable therewith. The process also may be used with partially or completely polymerized polymers, such as acrylonitrile/butadiene copolymer, in place of one or more of the ethylenically unsaturated monomers during interpolymerization of the acrylonitrile and the alpha-methyl styrene. Substantial benefits and advantages accrue in all such applications from the use of the claimed multistage, bulk polymerization process. As illustrative of a number of the polymer products that may be prepared by the process, there are acrylonitrile/alpha-methyl styrene copolymers; acrylonitrile/styrene/alpha-methyl styrene terpolymers; acrylonitrile/alpha-methyl styrene/diisobutylene terpolymers; acrylonitrile/alpha-methyl styrene/butadiene terpolymers; acrylonitrile/alpha - methyl styrene/(acrylonitrile/butadiene) polymer blends; acrylonitrile/alpha-methyl styrene/styrene/ethylacrylate tetrapolymers; and the like.

As obvious and apparent to one skilled in the art, numerous and varied ethylenically unsaturated monomers are able to be interpolymerized with acrylonitrile and alpha-methyl styrene, and numerous and varied partially and completely polymerized materials, which will be able to be blended with these co-, ter-, tetra-, etc., monomer combinations of acrylonitrile and alpha-methyl styrene, are known.

onitrile. All of the acrylonitrile monomer and a major proportion of the azoisobutyronitrile catalyst and alpha-methyl styrene solution of the acrylonitrile-butadiene copolymer constitute the initial charge to the prepolymerization reactor kettle. Incremental additions of the remainder of the alpha-methyl styrene solution of the acrylonitrile/butadiene copolymer and azoisobutyronitrile catalyst are made during the prepolymerization stage. The prepolymerization is for about 10 hours with a temperature between 60° and 80° C., being maintained. A further bulk polymerization and a devolatilization are in substantial accordance with the procedure of Example I, except that the spacing of the cored plates in the plate-and-frame reactor is only about 2 inches apart. Also, the further bulk polymerization is for about 24 hours with a temperature between about 100° and 140° C. being maintained. The final polymer product, obtained in a yield of about 95 percent, is of an acrylonitrile content of about 32 percent, estimated from the nitrogen content of the polymer by Kjeldahl analysis, and of an average molecular weight of 28,000, estimated from the intrinsic viscosity of the polymer in dimethyl formamide solution by the equation of Krigbaum and Kotliar.

Upon molding of the polymer product in a conventional injection molding machine, and after annealing the molding at 60 to 70° C. for 24 hours, the polymer moldings are found to have a modulus of $5.3 \times 10^5$ p.s.i., and a flexural strength of 15,500 p.s.i. (ASTM D–790–59–T), an Izod impact strength of 0.16 foot-pound-per-inch notch (ASTM D–256–56, Method A), and a heat-deflection temperature of 84° C. (ASTM D–648–56).

TABLE IV.—ACRYLONITRILE/STYRENE/α-METHYL STYRENE/ETHYL ACRYLATE TETRAPOLYMERS

|  | Example X (22AN/48S/10 α MS/20EA)[a] | Example XI (30AN/30S/20 α MS/20EA)[a] | Example XII (30AN/40S/20 α MS/10EA)[a] |
|---|---|---|---|
| Acrylonitrile Content, percent | 21.7 | 29 | 29 |
| Ethyl Acrylate Content, percent | 15.4 | 14 | 10 |
| Flexural Properties (ASTM D–790–59T): |  |  |  |
| Strength, p.s.i. | 16,400 | 17,700 | 20,000 |
| Modulus, $10^5$ p.s.i. | 4.81 | 5.1 | 5.4 |
| Impact Strength: |  |  |  |
| Izod, ft.-lb./in. notch (ASTM D256–56) | 0.245 | 0.215 | 0.2 |
| Tensile, ft.-lb./in.$^2$ (ASTM 1822–61T): |  |  |  |
| Long Neck | 42.6 | 35 | 58 |
| Short Neck | 18.5 |  |  |
| Heat Deflection Temperature, C. (ASTM D621–59) | 72 | 82 | 92 |

[a] AN=acrylonitrile monomer; S=styrene monomer; α-MS=alpha-methyl styrene monomer; EA=ethyl acrylate monomer.

*Examples X to XII*

These examples are of the preparation of tetrapolymers employing acrylonitrile (AN), styrene (S), alpha-methyl styrene (alpha-MS), and ethyl acrylate (EA) monomers in the ratios of 22 AN/48 S/10 alpha-MS/20 EA; 30 AN/30 S/20 alpha-MS/20 EA; and AN/40 S/20 alpha-MS/10 EA, respectively.

In general, the process of preparation is substantially like the procedure of Example I. The initial charge of reactants to the prepolymerization reactor kettle includes all of the acrylonitrile and a major proportion of each of the styrene, alpha-methyl styrene, ethyl acrylate, and the initiator (alpha,alpha' - azobisisobutyronitrile). Incremental additions of the remainder of the styrene, alpha-methyl styrene, ethyl acrylate, and the initiator are made during the course of the prepolymerization. When the prepolymerized reactants are converted to a viscous sirupy mass (a solids content of about 30 to 60 percent in about 3 hours), transfer of this prepolymer is made to the plate-and-frame reactor (plates spaced about five inches apart) and this mass further polymerized to in excess of 90 percent conversion to the tetrapolymer without agitation. This further polymerized tetrapolymer product consists of solid blocks which are crushed and devolatilized by means of an extruder equipped with the devolatilizer means as described in Example I.

Table IV which follows sets forth some analyses and properties of the resulting tetrapolymer products, after the products are injection molded and annealed for 16 to 24 hours at 60° to 80° C.

*Example XIII*

Example I is repeated substantially in substance, except that the total charge for the prepolymerization includes 75 parts of an essentially gel-free approximately 33 percent acrylonitrile/67 percent butadiene copolymer dissolved in 997.5 parts of alpha-methyl styrene, 427.5 parts of acrylonitrile, and 4.5 parts of alpha,alpha'-azoisobutyr-

*Examples XIV–XIX*

Example 1 is repeated several times and the resulting 28 AN/52 S/20 alpha-MS bulk prepared terpolymers are ground and mixed into a composite terpolymer sample for subsequent employment in these examples.

Portions of this composite terpolymer sample are blended by Banbury mixing with experimental nitrile rubbers, produced by emulsion polymerization techniques, in the ratio of 75 parts of the terpolymer and 25 parts of the nitrile rubber. The terpolymer along with 0.2 phr. magnesium stearate is preheated to 180° F. prior to blending with the nitrile rubber, and the hot terpolymer and rubber are added alternately to a size "B" Banbury mixer (at 100° F.) during the first 30 seconds of mixing. The Banbury is run at "Speed 2" and cold water-cooled rolls used to minimize the peak temperature (generally ranging from 340° to 370° F.). The blends then are removed from the Banbury after about 5 minutes mixing time and are sheeted on a cold 2-roll mill. Table V, which follows, sets forth illustrative examples of a number of the thus prepared terpolymer-nitrile rubber blends and includes data for some properties of the resulting blends and of the nitrile rubbers which are employed in the preparation of these various blends.

While the multistage bulk polymerization process has been described with particularity by employment of alpha,alpha'-azobisisobutyronitrile in small amounts as an initiator or catalyst, other conventional initiators or catalysts, or mixtures thereof, for free radical polymerization are useful. In particular, alpha,alpha'-azobisisobutyronitrile is preferred, although other conventional azo-type polymerization catalysts are quite useful. Azo-type catalysts are characterized by the presence in the molecule of the group —N=N— bonded to one or two organic radicals, preferably at least one of the bonds being to a tertiary carbon atom. In addition to the preferred catalyst, illustrative azo-type catalysts are disclosed and illustrated in U.S. Patents 2,846,424, G. Mino, and 2,471,959, M. Hunt. Peroxide initiators can be used also, but are usually less satisfactory for practice of the process in that they generally are relatively ineffective at the most desirable temperatures for prepolymerization and, when used, generally decrease the thermal and color stability of the polymer product and in other manners detract from realization of the full advantages of the invention obtainable by employment of preferred materials. Illustrative of peroxide catalysts and initiators are: benzoyl peroxide; lauryl peroxide; tertiary butyl hydroperoxide; tertiary butyl perbenzoate; ditertiary butyl perbenzoate; ditertiary butyl peroxide; and the like.

of all or a portion of the preferred acrylonitrile monomer, methacrylonitrile, ethacrylonitrile, phenylacrylonitrile monomers, and mixtures of these monomers may be employed. In place of all or a portion of the preferred alpha-methyl styrene, other alpha-lower alkyl styrene monomers may be employed, such as alpha-ethyl styrene, alpha-propyl styrene, alpha-butyl styrene, and the like nuclear substituted alpha-lower alkyl styrene monomers having one or more methyl and/or ethyl groups attached to the styrene nucleus. It should be understood, as will be obvious to those skilled in the art, when replacing the preferred acrylonitrile and alpha-methyl styrene monomers, in whole or in part, by such other useful monomers, that minor variations in process conditions, such as temperature, may be required, and that in some instances the resulting polymers may be of slightly different quality than the polymer products produced by the practice of the process with the preferred monomers. On the whole, however, substitution of such monomers, in whole or in part, for the preferred acrylonitrile and alpha-methyl styrene monomers, still provides a multistage bulk polymerization process and polymer products which continue to possess and to retain a substantial proportion of the advantages of the invention, although not necessarily exactly equivalent advantages and benefits.

Various changes and modifications of the invention

TABLE V. 75 ASMS/25 NITRILE RUBBER BLENDS *

| Example No. | Nitrile Rubber a | | | | Properties of Blends f | | | | | | |
|---|---|---|---|---|---|---|---|---|---|---|---|
| | Monomer Composition b | Gel Content,c percent | Swelling Index d | Mooney Viscosity e | Gel Content,c percent | Swelling Index d | Flexural Strength, p.s.i. | Flexural Modulus, 10⁵ p.s.i. | Heat-Deflection Temperature, C. | Notched Izod Impact, ft.-lb./in. notch | Tensile Impact (L) Specimen, ft.-lb./in.² |
| XIV | 35 AN/65 Bd | 52 | 55 | 93 | 9 | 23 | 10,300 | 3.59 | 92 | 6.7 | 134 |
| XV | 31 AN/61 Bd/8 S | 52 | 43 | 120 | 11 | 21 | 11,000 | 3.40 | 96 | 6.1 | 130 |
| XVI | 31 AN/61 Bd/8 S | 36 | 45 | 83 | 4 | 25 | 10,500 | 3.57 | 94 | 5.2 | 145 |
| XVII | 31 AN/61 Bd/8 α-MS | 68 | 18 | 158 | 16 | 19 | 10,900 | 3.36 | 94 | 5.1 | 148 |
| XVIII | 31 AN/61 Bd/8 α-MS | 44 | 66 | 84 | 11 | 24 | 10,200 | 3.47 | 93 | 3.9 | 122 |
| XIX | 31 AN/30.6 Bd/8 S/30.4 I | 52 | 47 | 80 | 10 | 27 | 10,000 | 3.54 | 90 | 1.0 | 113 |

* ASMS=Composite of bulk prepared, ground crude 28 acrylonitrile/52 styrene/20α-methyl styrene terpolymer prepared by the procedure of Example I<sub>j</sub>.
a Nitrile Rubber=Experimental nitrile rubbers prepared by emulsion polymerization techniques from the monomer compositions as indicated with resulting nitrile rubbers possessed of the properties as tabulated.
b AN=acrylonitrile; Bd=butadiene; S=styrene; α-MS=α-methyl styrene; I=isoprene; all parts by weight.
c Insoluble content after immersion in methyl ethyl ketone for 24 hours at room temperature (U.S. Patent 2,600,024).
d Determined on methyl ethyl ketone insoluble portion of rubber, or blend (U.S. Patent 2,600,024).
e ASTM Test Method D1646-59T (4 minutes at 212 F).
f Specimens were injection molded and annealed at 80±2C prior to testing.

For a most advantageous practice of the multistage process, the catalyst is employed in conventional amounts, or less than conventional amounts, most desirably the minimum amount sufficient to initiate and to maintain a polymerization reaction at the desired temperature. Usually, the total amount of employed initiator or catalyst does not exceed about 0.1 part per 100 parts of the total monomers. Catalyst should not be added after completion of the prepolymerization stage of the process. Preferably the major portion of the employed catalyst is added when the reactants, including the total amount of acrylonitrile, are charged initially, and the remaining amount of employed catalyst added in increments during the prepolymerization when the balance of the interpolymerizable compounds are added. Most desirably, all of the employed catalyst is added before and during the early stages of the prepolymerization, i.e., before the allotted prepolymerization time exceeds more than about two-thirds of the total time of the prepolymerization. By proceeding in this most desirable manner for initiator addition, excessive pressure build-up is avoided in the further polymerization.

While the invention has been described with particularity by employment of acrylonitrile and alpha-methyl styrene monomers, which are preferred for practice of the invention, other acrylonitrile monomers and other alpha-lower alkyl styrene monomers are useful. In place will be obvious to those skilled in the art. It is desired to include all such changes and modifications that fall within the true spirit of the invention and to limit the invention only as set forth in the appended claims.

What is claimed is:

1. A multistage bulk polymerization process for production of a thermoplastic polymer product containing from about 15 to 48 percent of chemically combined acrylonitrile and at least one other chemically combined interpolymerizable material, which process comprises the steps of:

(a) bulk prepolymerizing a reactant mixture, which comprises, for each 100 parts of the reactant mixture, from about 15 to 48 parts of acrylonitrile monomer, from 1 to 52 parts of an alpha-lower alkyl styrene monomer in at least a minimum amount thereof effective as a reactive polymerization moderator and from 0 to 84 parts of at least one other polymerizable monomer interpolymerized therewith, to a conversion of about 30 to 60 percent polymeric material with the bulk prepolymerizing being conducted with agitation of the reactant mixture at a temperature between 60° and 100° C., with an initial charge of reactant mixture containing all of the acrylonitrile monomer and from 60 to 80 percent of the alpha-lower alkyl styrene monomer and from 60 to 80 percent of said other polymerizable monomer, and with the balance of the alpha-lower alkyl styrene monomer and the balance of said other polymerizable monomer added to the reactant mixture during the bulk prepolymerizing before completion of the bulk prepolymerizing; and (b) further bulk polymerizing the resulting prepolymer product of step (a) to a conversion in excess of about 90 percent polymeric material in the form of a solid of a thickness between about 2 and 6 inches, with the bulk further polymerizing being conducted without agitation of said prepolymer and with said prepolymer being maintained between 100° C. and 200° C.

2. The process of claim 1, including a subsequent step of:

(c) processing the solid resulting from the further bulk polymerizing step (b) to remove nonpolymerized monomers and volatile materials and to provide a thermoplastic polymer product of greater than 98 percent polymeric material in a particle size suitable for thermoplastic molding.

3. The process of claim 2 employing the reactant mixture in which the alpha-lower alkyl styrene monomer is alpha-methyl styrene monomer.

4. The process of claim 2 employing the reactant mixture which contains alpha-methyl styrene and acrylonitrile monomers as reactants and an amount of alpha-methyl styrene which does not exceed a one to one molar ratio with the acrylonitrile.

5. The process of claim 2 employing the reactant mixture containing acrylonitrile, alpha-methyl styrene, and styrene monomers.

6. The process of claim 2 employing the reactant mixture containing acrylonitrile and alpha-methyl styrene monomers and up to about 35 parts of an acrylonitrile-butadiene copolymer.

7. The process of claim 2 employing the reactant mixture containing acrylonitrile, alpha-methyl styrene, and diisobutylene monomers.

8. A multistage bulk polymerization process for production of a thermoplastic polymer product containing from about 20 to 35 parts of chemically combined arcylonitrile monomer and at least one other chemically combined interpolymerizable material, which process comprises the steps of:

(a) bulk prepolymerizing a reactant mixture, which comprises, for each 100 parts of the reactant mixture, from about 20 to 35 parts of acrylonitrile monomer and at least a minimum amount of alpha-lower alkyl styrene monomer effective as a reactive polymerization moderator, to conversion of about 30 to 60 percent polymeric material with the bulk prepolymerizing being conducted with agitation of the reactant mixture at a temperature between 60° and 100° C., with an initial charge of reactant mixture containing all of the employed acrylonitrile monomer and from 60 to 80 percent of the alpha-lower alkyl styrene monomer, with the balance of the alpha-lower alkyl styrene monomer added to the reactant mixture during the bulk prepolymerizing before completion of the bulk prepolymerizing, and with said minimum amount of alpha-lower alkyl styrene monomer being about 7 parts when employing 20 parts of acrylonitrile monomer in 100 parts of reactant mixture, being about 31 parts when employing 35 parts of acrylonitrile monomer in 100 parts of reactant mixture, and being an amount between 7 and 31 parts which is in direct proportion to the amount of acrylonitrile monomer in excess of 20 parts when employing between 20 and 35 parts of acrylonitrile monomer in 100 parts of reactant mixture; and (b) further bulk polymerizing the resulting prepolymer of step (a) to a conversion in excess of about 90 percent polymeric material in the form of a solid of a thickness between about 2 and 6 inches, with the further bulk polymerizing being conducted without agitation of said prepolymer and with said prepolymer being maintained between 100° C. and 200° C.

9. The process of claim 8, including a subsequent step of:

(c) processing the solid resulting from the further bulk polymerizing step (b) to remove volatile materials and to provide a thermoplastic polymer product of greater than 98 percent polymeric material in a particle size suitable for thermoplastic molding.

10. The process of claim 9 including, during the processing step (c), a breaking of said solid into pieces, an extruding of the pieces of the solid through a devolatilizer extruder to remove volatile materials and nonpolymerized monomers, and a pelletizing of the resulting extruded product to a particle size suitable for thermoplastic injection molding.

11. The process of claim 9 including a carrying forth of the bulk prepolymerizing step (a) to a conversion of polymeric material of a viscosity susceptible to transfer by fluid pressure means and a transferring of the resulting prepolymer by a fluid pressure means to a plate and frame reactor for a carrying forth of the bulk further polymerizing step (b).

12. The process of claim 11 including a maintaining, during the transferring, of the transferred prepolymer without substantial temperature change thereof to a plate and frame reactor of substantially the same temperature as the transferred prepolymer.

13. In production of a thermoplastic polymer product, containing from about 15 to 48 percent of chemically combined acrylonitrile and from about 85 to 52 percent at least one other chemically combined interpolymerizable material, from interpolymerizing a reactant mixture containing, for each 100 parts of the reactant mixture, from about 15 to 48 parts of acrylonitrile monomer, from about 1 to 52 parts of alpha-methyl styrene monomer and from 0 to 84 parts of at least one polymerizable monomer interpolymerizable therewith, the improvement of a multistage bulk polymerization process comprising the steps of:

(a) bulk prepolymerizing a reactant mixture with agitation at a relatively constant temperature of between about 60° and 100° C. to a viscous syrupy prepolymer of conversion approximately from 40 to 60 percent polymeric material with the bulk prepolymerzing being conducted with an initial charge of the reactant mixture containing all of the acrylonitrile monomer and from 60 to 80 percent of the alpha-methyl styrene monomer and from 60 to 80 percent of said other polymerizable monomer, with the balance of the alpha-methyl styrene monomer and the balance of said other polymerizable monomer being added to the reactant mixture during the bulk prepolymerizing before completion of the bulk prepolymerizing, and with at least a minimum amount of alpha-methyl styrene monomer being employed, which minimum amount is about 1 part of alpha-methyl styrene monomer when employing about 15 parts of acrylonitrile monomer and is about 52 parts of alpha-methyl styrene monomer when employing about 48 parts of acrylonitrile monomer and is a number of parts directly proportional and intermediate the numbers of parts employed with about 15 and 48 parts of acrylonitrile monomer when employing acrylonitrile monomer in amounts between 15 and 48 parts; and (b) further bulk polymerizing the resulting prepolymer of step (a) to a conversion in excess of about 95 percent polymeric material in the form of a solid of a thickness of between 4 and 6 inches, with the further bulk polymerization being conducted with said prepolymer in a static condition at a temperature of between 60° C. and 180° C.;

whereby employment of at least said minimum amount of alpha-methyl styrene monomer in the reactant mixture being polymerized functions as internal reactive polymerization moderator to moderate exothermic reaction temperatures during polymerization and enable an obtaining of a thermoplastic polymer product of excellent properties by bulk polymerization.

14. In production of a thermoplastic terpolymer product containing about 28 percent of chemically combined acrylonitrile monomer and a balance essentially of chemically combined styrene and alpha-methyl styrene monomers, the improvement of a multistage bulk polymerization process comprising the steps of:

(a) bulk prepolymerizing a reactant mixture with agitation at a relatively constant temperature of between about 60° C. and 100° C. to a conversion approximating from 40 to 60 percent polymeric material with the bulk prepolymerization being conducted on a reactant mixture consisting essentially of about 28 parts of acrylonitrile monomer, 20 parts of alpha-methyl styrene monomer, and about 52 parts of styrene monomer for each 100 parts of reactants in the reactant mixture, with an initial charge of the reactant mixture containing all of the acrylonitrile monomer and from 60 to 80 percent of the alpha-methyl styrene and styrene monomers, and with the balance of the alpha-methyl styrene and styrene monomers being added in incremental portions to the reactant mixture during the bulk polymerization with adding of the balance completed when the prepolymerization is from 65 to 85 percent completed; and (b) further bulk polymerizing the resulting prepolymer of step (a) to a conversion in excess of about 95 percent polymeric material in the form of a solid of a thickness of between 4 and 6 inches, with the further bulk polymerization being conducted with said prepolymer in a static condition at a temperature of between 60° C. and 180° C.

References Cited by the Examiner
UNITED STATES PATENTS

| | | | |
|---|---|---|---|
| 2,310,961 | 2/1943 | Kropa | 260—85.5 |
| 2,646,423 | 7/1953 | Wehr et al. | 260—85.5 |
| 2,694,692 | 11/1954 | Amos et al. | 260—880 |
| 2,745,824 | 5/1956 | Melchore | 260—85.5 |
| 3,141,868 | 7/1964 | Fivel | 260—85.5 |

MURRAY TILLMAN, *Primary Examiner.*

G. F. LESMES, *Assistant Examiner.*